United States Patent
Ohno et al.

(10) Patent No.: US 8,340,823 B2
(45) Date of Patent: Dec. 25, 2012

(54) CONTROLLER OF MOBILE ROBOT

(75) Inventors: Nobuyuki Ohno, Wako (JP); Tadaaki Hasegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1054 days.

(21) Appl. No.: 12/329,056

(22) Filed: Dec. 5, 2008

(65) Prior Publication Data

US 2009/0148035 A1    Jun. 11, 2009

(30) Foreign Application Priority Data

Dec. 10, 2007   (JP) ................................. 2007-318930

(51) Int. Cl.
  *B25J 9/10*   (2006.01)
  *G05B 19/04*  (2006.01)
  *B25J 5/00*   (2006.01)
  *B62D 57/032* (2006.01)
(52) U.S. Cl. .............................. 700/262; 700/245; 901/1
(58) Field of Classification Search .......... 318/567–580; 700/245–264; 901/1
  See application file for complete search history.

(56) References Cited

U.S. PATENT DOCUMENTS

| 2002/0022907 A1* | 2/2002 | Takenaka et al. | 700/245 |
| 2005/0104548 A1* | 5/2005 | Takenaka et al. | 318/568.12 |
| 2008/0065269 A1* | 3/2008 | Hasegawa | 700/260 |
| 2008/0133055 A1* | 6/2008 | Hasegawa | 700/252 |
| 2008/0133057 A1* | 6/2008 | Hasegawa | 700/258 |
| 2008/0208391 A1* | 8/2008 | Hasegawa et al. | 700/245 |
| 2009/0312867 A1* | 12/2009 | Hasegawa et al. | 700/245 |

FOREIGN PATENT DOCUMENTS

| JP | 08-272443 | 10/1996 |
| JP | 11-327648 | 11/1999 |
| JP | 2007-160428 | 6/2007 |
| WO | WO 2007069401 A1 * | 6/2007 |

\* cited by examiner

*Primary Examiner* — Khoi Tran
*Assistant Examiner* — Dale Moyer
(74) *Attorney, Agent, or Firm* — Rankin, Hill & Clark LLP

(57) ABSTRACT

A controller of a mobile robot that moves an object such that the position of a representative point of the object and the posture of the object follow a desired position and posture trajectory is provided. The desired posture trajectory of the object includes the desired value of the angular difference about a yaw axis between a reference direction, which is a direction orthogonal to the yaw axis of the object, and the direction of the moving velocity vector of the representative point of the object, defined by the desired position trajectory. The controller has a desired angular difference setting means which variably sets the desired value of the angular difference according to at least a required condition related to a movement mode of the object. This allows the object to be moved at a posture which meets the required condition of the movement mode.

4 Claims, 7 Drawing Sheets

CONTROLLER OF MOBILE ROBOT

BACKGROUND OF THE INVENTION

1. Field of the Invention

The present invention relates to a controller of a mobile robot which performs an operation of holding an object, such as a cart, with the hands at the distal portions of the arms thereof, and moving the object such that the position and the posture of the object follow desired trajectories.

2. Description of the Related Art

A technique for having a mobile robot perform an operation of moving an object, such as a cart, with the distal portions of the arms of the mobile robot kept in contact with predetermined portions at one end of the object has been proposed by the present applicant as disclosed in, for example, Japanese Patent Application Laid-Open No. 2007-160428 (hereinafter referred to as patent document 1). According to the technique, the motions of a bipedal mobile robot as the mobile robot are controlled such that the position of a representative point of the object and the posture of the object follow a desired position trajectory and a desired posture trajectory, respectively, based on a movement scheme of the object.

However, according to this type of conventional technique, a desired posture in a desired posture trajectory of the object has been set such that a predetermined reference direction of an object (e.g., the longitudinal direction of a cart) is always the same as the moving velocity vector of the representative point specified by a desired position trajectory of the representative point of the object (the tangential direction of a desired route of the representative point specified by a desired position trajectory). This has been presenting the following inconvenience.

For instance, it is assumed that a cart W as an object is moved toward a wall 50 by a robot 100, as illustrated in FIG. 7. This is an example wherein the cart W is moved to be disposed closely to the wall 50 such that the longitudinal direction (the X-axis direction in FIG. 7) of the cart W is parallel to the surface of the wall 50, as illustrated by the cart W indicated by the two-dotted chain line at a final destination St. FIG. 7 is a plan view illustrating the robot 100 and the cart W observed from above at certain time in the middle of the movement of the cart W carried by the robot 100. In the illustrated example, the representative point of the cart W is set at a rear end portion thereof adjacent to the robot 100. The reference direction of the cart W is the longitudinal direction of the cart W.

Here, a case is assumed where the desired route specified by the desired position trajectory of the representative point of the cart W is set as, for example, the desired route indicated by a reference numeral 200 in FIG. 7. In this case, if the cart W can be moved along the desired route 200, then it is possible to make the position and the posture of the cart W at the destination St agree with the position and the posture of the cart W indicated by the two-dotted chain line.

However, according to the desired route 200, the cart W collides with the wall 50 in the vicinity of a section wherein the longitudinal direction (the x-axis direction) as the reference direction of the cart W is changed from the direction aslant with respect to the surface of the wall 50 to the direction parallel to the wall surface. Therefore, it is actually impossible to move the cart W along the desired route 200.

It is necessary, therefore, to move the cart W to the vicinity of the destination St along, for example, a desired route indicated by reference numeral 202, as illustrated in FIG. 7. According to the route 202, the longitudinal direction of the cart W is shifted, at a position relatively apart from the wall 50, from the direction aslant with respect to the surface of the wall 50 to the direction parallel to the wall surface.

However, according to the desired route 202, the position of the representative point of the cart W deviates from the proper desired position (the position of the representative point of the cart W indicated by the two-dotted chain line) and becomes excessively apart from the wall 50 although the desired route 202 allows the posture of the cart W in the vicinity of the destination St to agree with the desired posture (the posture of the cart W indicated by the two-dotted chain line). Therefore, it has been necessary to move the cart W back and forth to gradually bring the cart W close to the wall 50 in the vicinity of the destination St while maintaining the posture of the cart W such that the longitudinal direction thereof is approximately parallel to the wall surface of the wall 50. As a result, it has inconveniently been taking time to make the position and the posture of the representative point of the cart W reach a final desired position and a final desired posture and it has also been inconveniently required to prepare a complicated desired position trajectory of the representative point of the cart W.

Furthermore, there has been another inconvenience described below with a conventional technique in which a desired posture trajectory of an object is generated such that the predetermined reference direction of the object is always the same direction as the moving velocity vector of the representative point defined by the desired position trajectory of the representative point of the object.

For example, it is assumed that the desired route 202 of the representative point of the cart W has an obstacle 52, such as an installed object, beside a curving point Sa and the pathway width (the width of the area through which the cart W and the robot 100 pass) at the curving point Sa is relatively small, as illustrated in FIG. 7. In this case, if an attempt is made to change the posture of the cart W (the posture about the yaw axis) to trace the desired route 202 at the point Sa, the cart W or the robot 100 has inconveniently tended to collide with the obstacle 52.

SUMMARY OF THE INVENTION

With the view of the aforesaid background, an object of the present invention is to provide a controller of a mobile robot which is capable of moving an object at a posture satisfying a required condition of a movement mode.

To this end, a controller of a mobile robot according to the present invention is a controller of a mobile robot which performs an operation of moving an object such that the position of a representative point (a point which represents the spatial position of the object) of the object and the posture of the object follow a desired position trajectory and a desired posture trajectory, respectively, while maintaining a distal portion of an arm thereof in contact with a predetermined portion of the object, the controller comprising a desired angular difference value setter which variably sets the desired value of an angular difference on the basis of at least a required condition related to the movement mode of the object, wherein a desired posture in the desired posture trajectory includes a desired value of the angular difference about a yaw axis between a reference direction preset for the object which is a direction orthogonal to the yaw axis of the object and the direction of the moving velocity vector of the representative point of the object defined by the desired position trajectory (a first aspect of the invention).

In the present invention, the desired position trajectory of the representative point of an object means the time series of the desired spatial position of the representative point. Similarly, the desired posture trajectory of an object means the time series of the desired spatial orientation of the object. The yaw axis means the axis in the direction perpendicular to a floor surface in an environment in which a mobile robot and an object move or an axis in the vertical direction. In this case, "the perpendicular direction" or "the vertical direction" does not have to be a perpendicular direction or a vertical direction in a strict sense, and they may slightly deviate from the perpendicular direction or the vertical direction in a strict sense.

The first aspect of the invention makes it possible to variably set the desired value of the angular difference about the yaw axis between the reference direction of an object and the direction of the moving velocity vector of the representative point of the object defined by the desired position trajectory (in other words, the tangential direction of a desired spatial route of the representative point of the object defined by the desired position trajectory) according to a required condition of the movement mode of the object. With this arrangement, the desired posture of the object about the yaw axis can be set to a posture satisfying a required condition of the movement mode of the object. Further, the motions of the mobile robot are controlled such that the position of the representative point of the object and the posture of the object follow the desired position trajectory and the desired posture trajectory which includes the desired value of the angular difference. This allows the object to be moved at a posture which satisfies the required condition of the movement mode.

In the first aspect of the invention, the controller of a mobile robot preferably comprises an object representative point setter which variably sets the position of the representative point of the object in an object coordinate system fixed to the object on the basis of the desired value of the angular difference such that the inertial moment of the object about the yaw axis passing the representative point changes on the basis of the desired value of the angular difference (a second aspect of the invention).

More specifically, depending on the angular difference, the posture of the object about the yaw axis easily deviates from a desired posture due to a moment attributable to a force acting on the object from the mobile robot. In such a circumstance, adjusting the position of the representative point of the object (the position in the object coordinate system) makes it possible to reduce the inertial moment of the object about the yaw axis passing the representative point. Thus, reducing the inertial moment of the object allows the posture to quickly follow the desired posture while controlling the force required to be applied to the object from the mobile robot in order to make the posture of the object follow the desired posture to a relatively small force (i.e., while restraining the force from becoming excessive).

In the second aspect of the invention, more specifically, if the predetermined portion of the object in contact with the distal portion of an arm of the mobile robot is a portion adjacent to one end of the object, and if the angular difference in a state wherein the direction of the interval between one end and the other end of the object agrees with the direction of the moving velocity vector in the plan view observed in the direction of the yaw axis is defined as a first angular difference, and the angular difference in a state wherein the direction of the interval and the direction of the moving velocity vector are orthogonal to each other is defined as a second angular difference, then the object representative point setter preferably sets the position of the representative point such that the inertial moment of the object decreases as the desired value of the angular difference is closer to the second angular difference than the first angular difference (a third aspect of the invention).

In the third aspect of the invention, since the predetermined portion of the object in contact with the distal portion of the arm of the mobile robot is the portion adjacent to one end of the object, the posture of the object about the yaw axis tends to deviate from the desired posture more easily when the object is moved by the mobile robot as the desired value of the angular difference is closer to the second angular difference, i.e., as the direction of the interval between one end and the other end of the object and the direction of the moving velocity vector become closer to an orthogonal state. Therefore, according to the third aspect of the invention, the position of the representative point is set such that the inertial moment of the object is reduced as the desired value of the angular difference is closer to the second angular difference than the first angular difference. This arrangement allows the posture to promptly follow the desired posture while controlling the force required to be applied to the object from the mobile robot in order to make the posture of the object follow the desired posture to a relatively small force (i.e., while restraining the force from becoming excessive) in the aforesaid situation wherein the desired value of the angular difference is closer to the second angular difference, causing the posture of the object about the yaw axis to easily deviate from the desired posture. Further, in the situation wherein the desired value of the angular difference is closer to the first angular difference, the inertial moment of the object becomes slightly large, permitting higher stability of the posture of the object about the yaw axis.

In the first to the third aspects of the invention described above, the required condition includes, for example, a condition that the object is brought close to a wall or an installed object with the lengthwise direction of the object set in parallel to the surface of the wall or the side surface of the installed object at the destination of the movement of the object. In this case, the desired angular difference value setter preferably sets the desired value of the angular difference such that the lengthwise direction of the object remains in parallel to the surface of the wall or the side surface of the installed object at least from the point at which the distance from the surface of the wall or the side surface of the installed object to the object reaches a predetermined distance or less to the destination in a desired spatial route of the representative point of the object defined by the desired position and posture trajectory (a fourth aspect of the invention).

According to the fourth invention, the desired value of the angular difference is set such that the lengthwise direction of the object remains in parallel to the wall or the side surface of the installed object at least from the point at which the distance from the wall or the side surface of the installed object to the object reaches a predetermined distance or less to the destination. This arrangement makes it possible to bring the object close to the wall or the installed object such that the posture of the object at the destination will be the desired posture, namely, the desired posture in which the lengthwise direction of the object is parallel to the wall or the side surface of the installed object, by moving the object to the destination along a monotonous route without the need for changing the posture of the object at a location in the vicinity of the destination.

The "parallel" in the fourth aspect of the invention does not have to be "parallel" in a strict sense, and may slightly deviate from the "parallel" in the strict sense.

In the first to the fourth aspects of the invention described above, if the required condition includes a condition that, when the object and the mobile robot are moved in an area wherein an obstacle exists beside a desired spatial route of the representative point of the object defined by the desired position and posture trajectories, the interval between the object and the mobile robot and the obstacle is maintained at a predetermined value or more, then the desired angular difference value setter preferably sets the desired value of the angular difference such that the required condition is met (a fifth aspect of the invention).

According to the fifth aspect of the invention, even in the case where an obstacle exists beside the desired route, making the width of the pathway through which the object and the mobile robot pass is relatively small, it is possible to move the object and the mobile robot through the pathway by setting the desired posture of the object which allows the object or the mobile robot to avoid colliding with the obstacle.

In the first to the fifth aspects of the invention described above, the controller of a mobile robot does not necessarily have to be installed in the mobile robot; alternatively, the controller may be provided outside the mobile robot. Further, the functions of the desired angular difference value setter and the object representative point setter may be provided in the form of separate control units.

DESCRIPTION OF THE PREFERRED EMBODIMENTS

Figure 1:
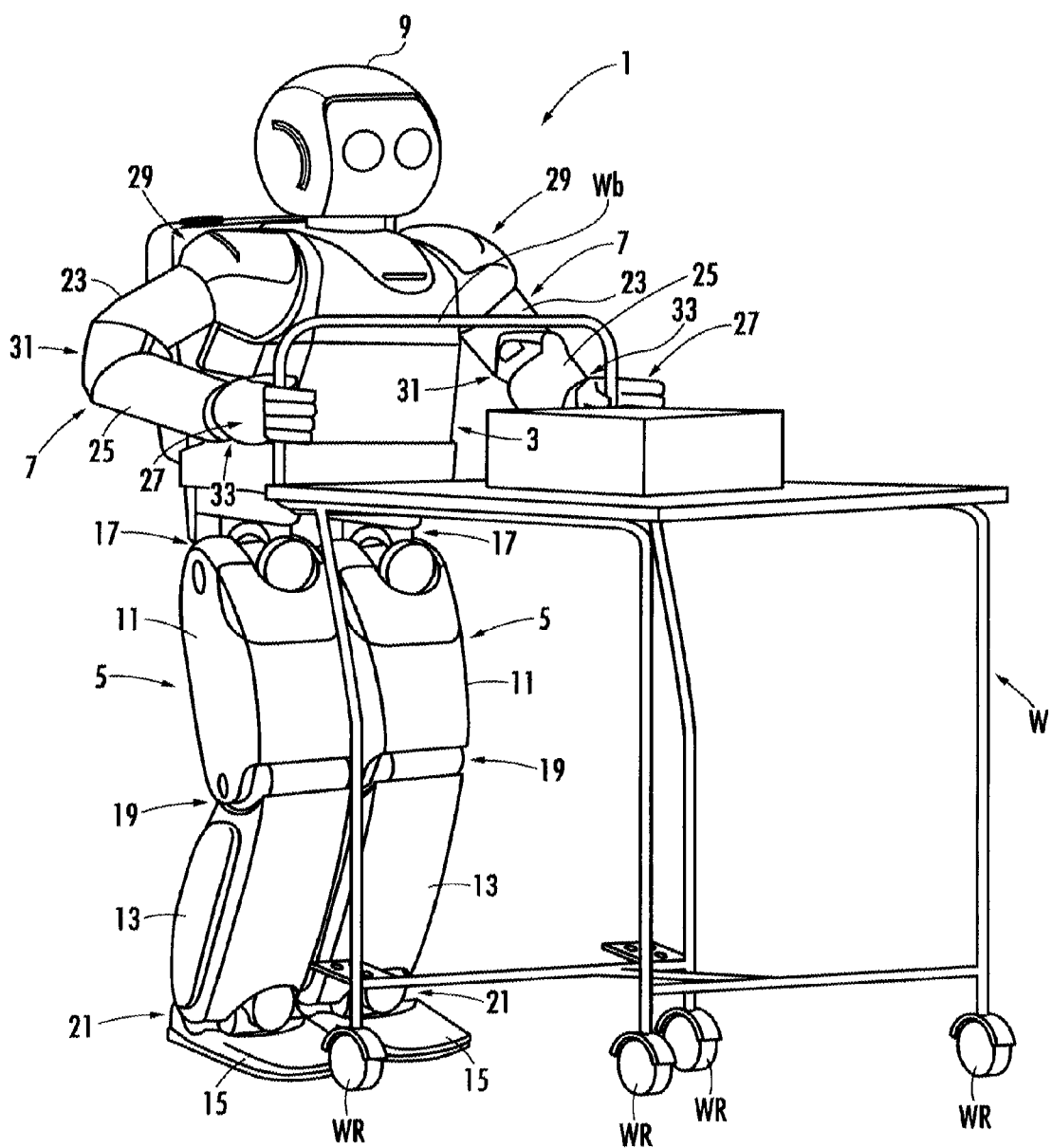
FIG. 1 is an external perspective view of a mobile robot according to an embodiment of the present invention and an object.
Figure 2:
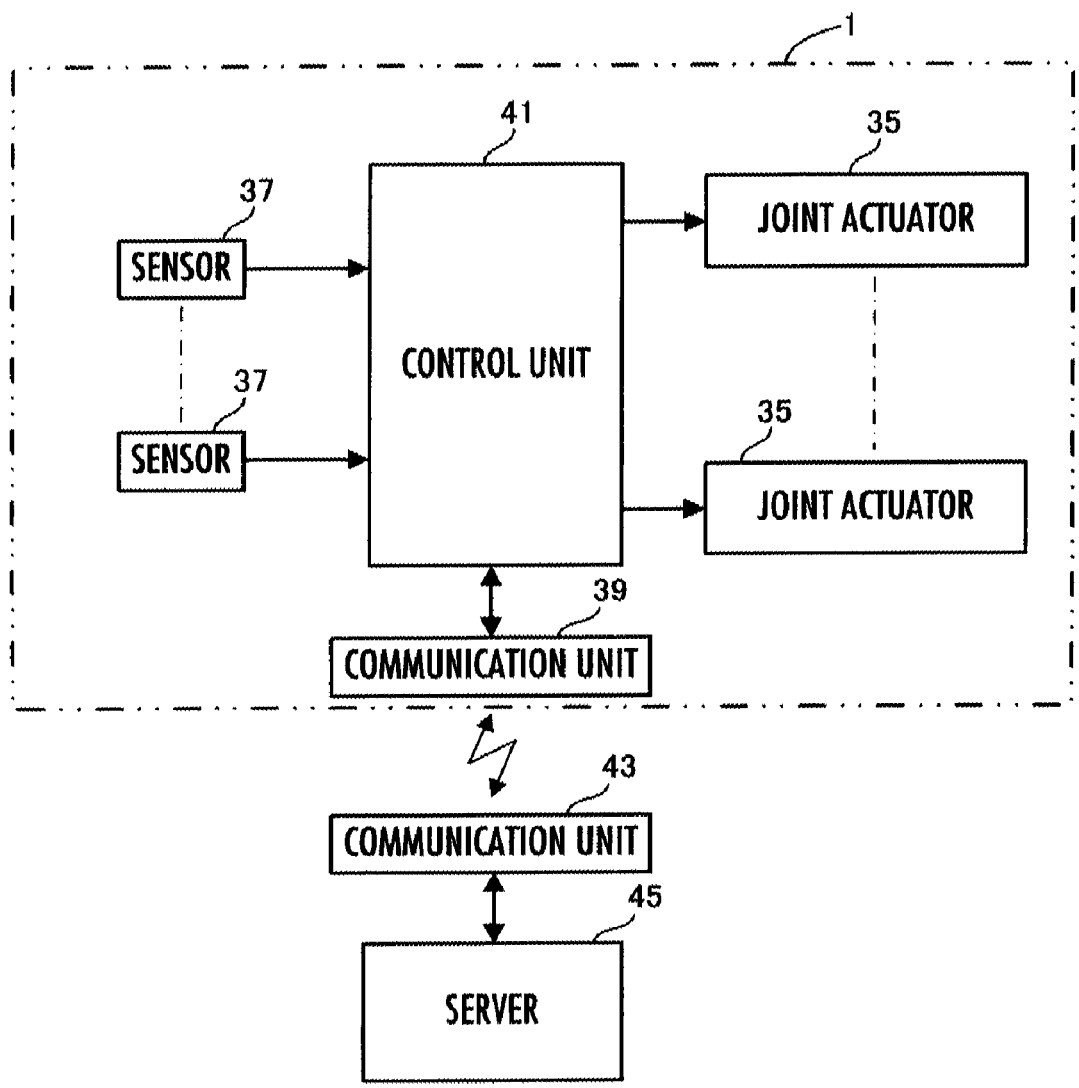
FIG. 2 is a block diagram illustrating the system construction related to the motion control of the mobile robot in the embodiment.
Figure 3:
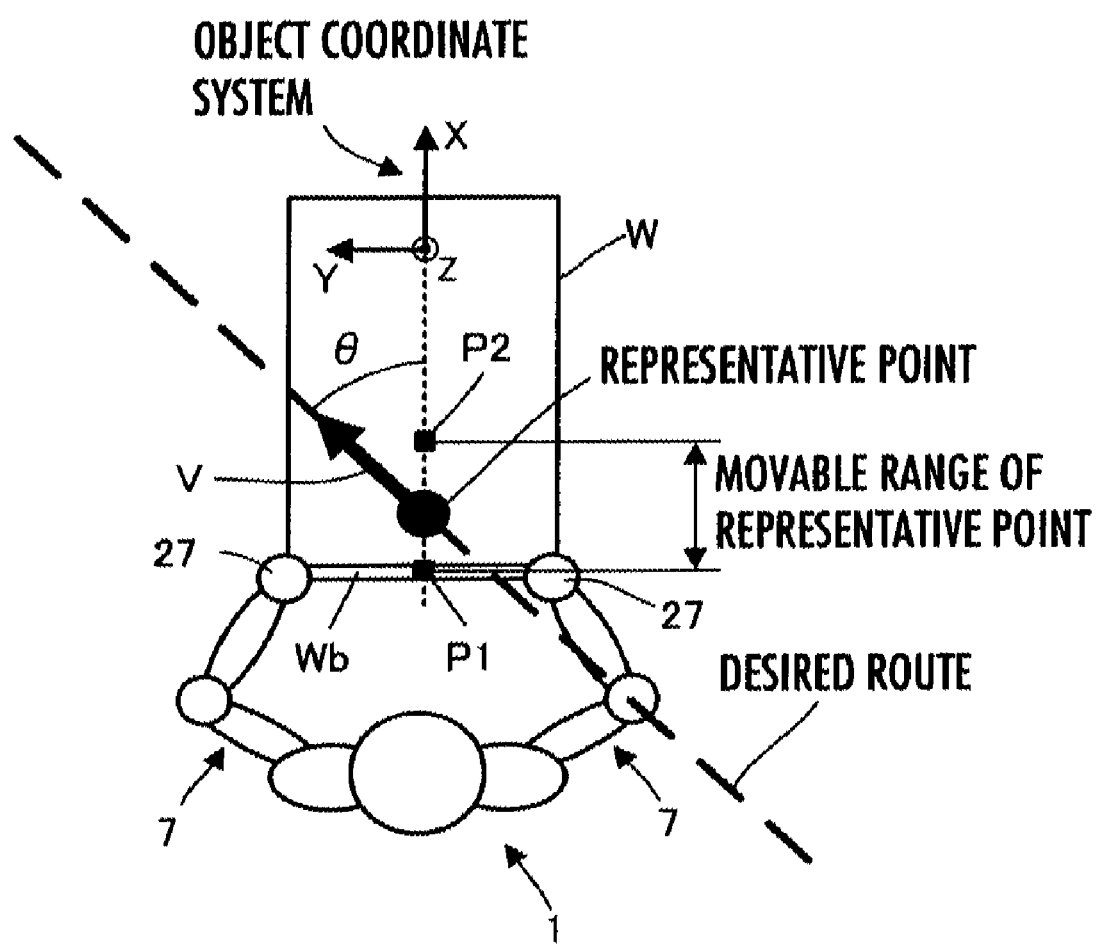
FIG. 3 is a plan view of the mobile robot and the object moved by the mobile robot in the embodiment observed in the direction of a yaw axis.
Figure 4:
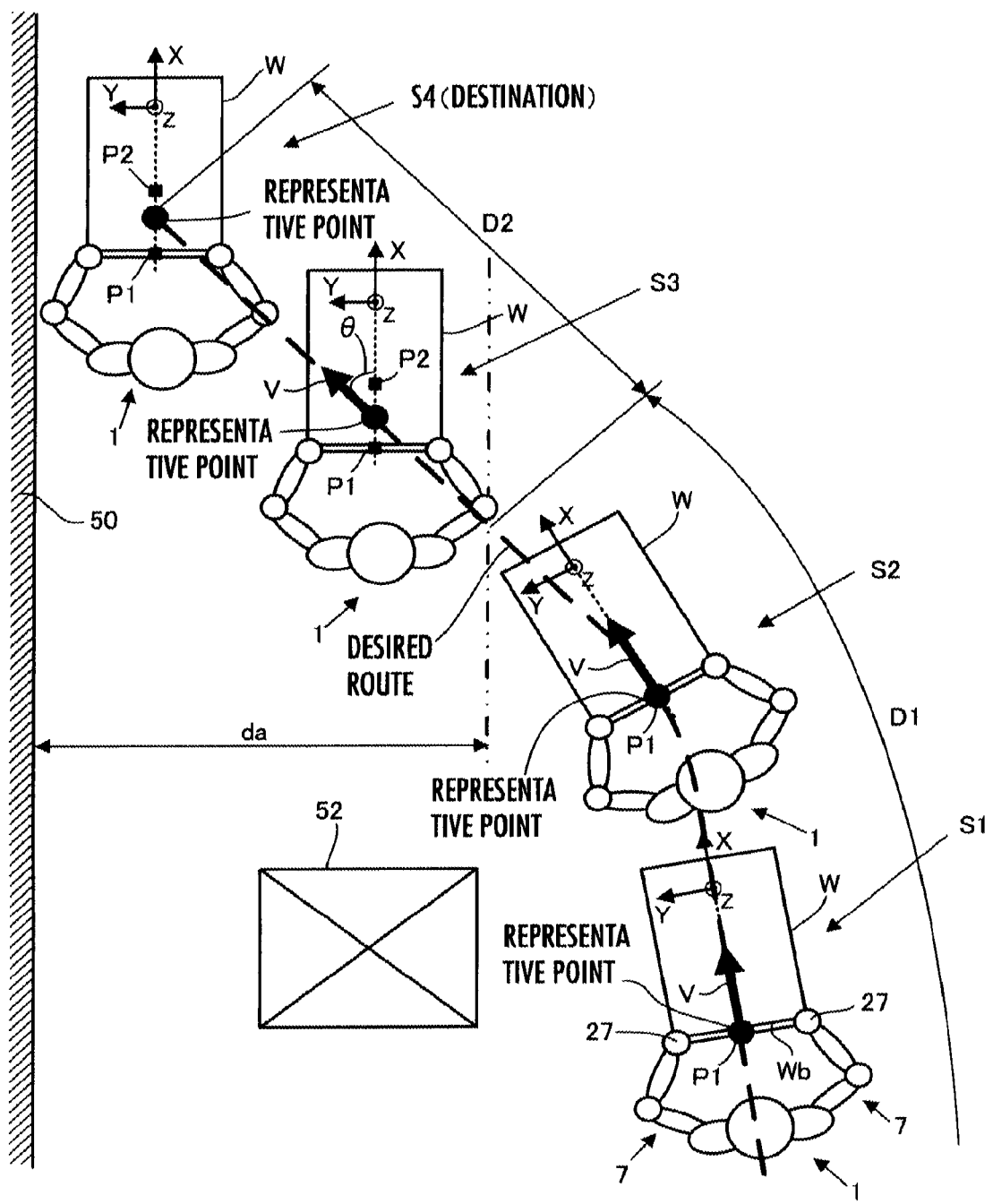
FIG. 4 is an explanatory diagram illustrating an example of the processing by a server provided in the system of the embodiment.
Figure 5:
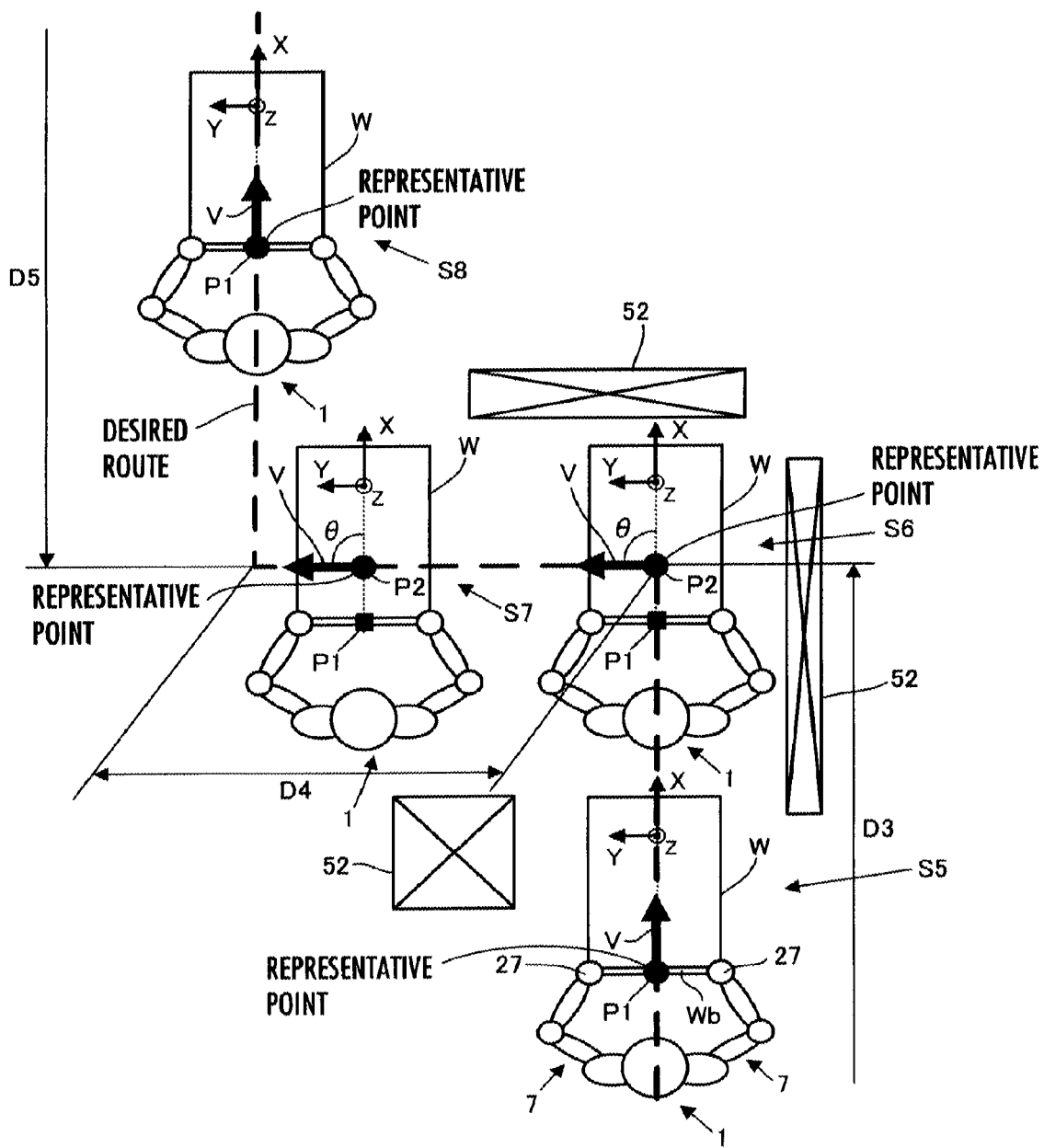
FIG. 5 is another explanatory diagram illustrating an example of the processing by the server provided in the system of the embodiment.
Figure 6:
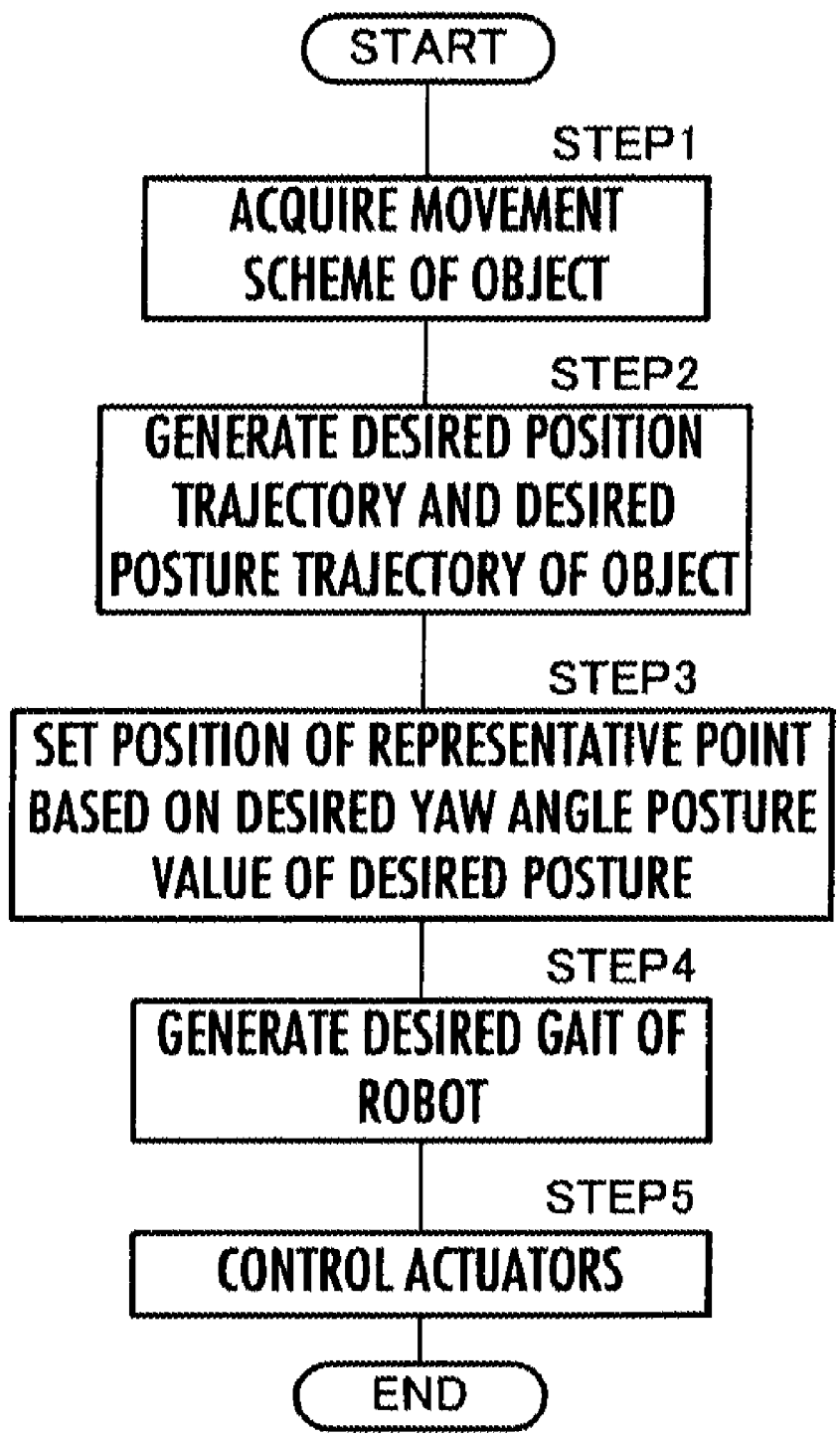
FIG. 6 is a flowchart illustrating the processing by a controller provided in the mobile robot of the embodiment.
Figure 7:
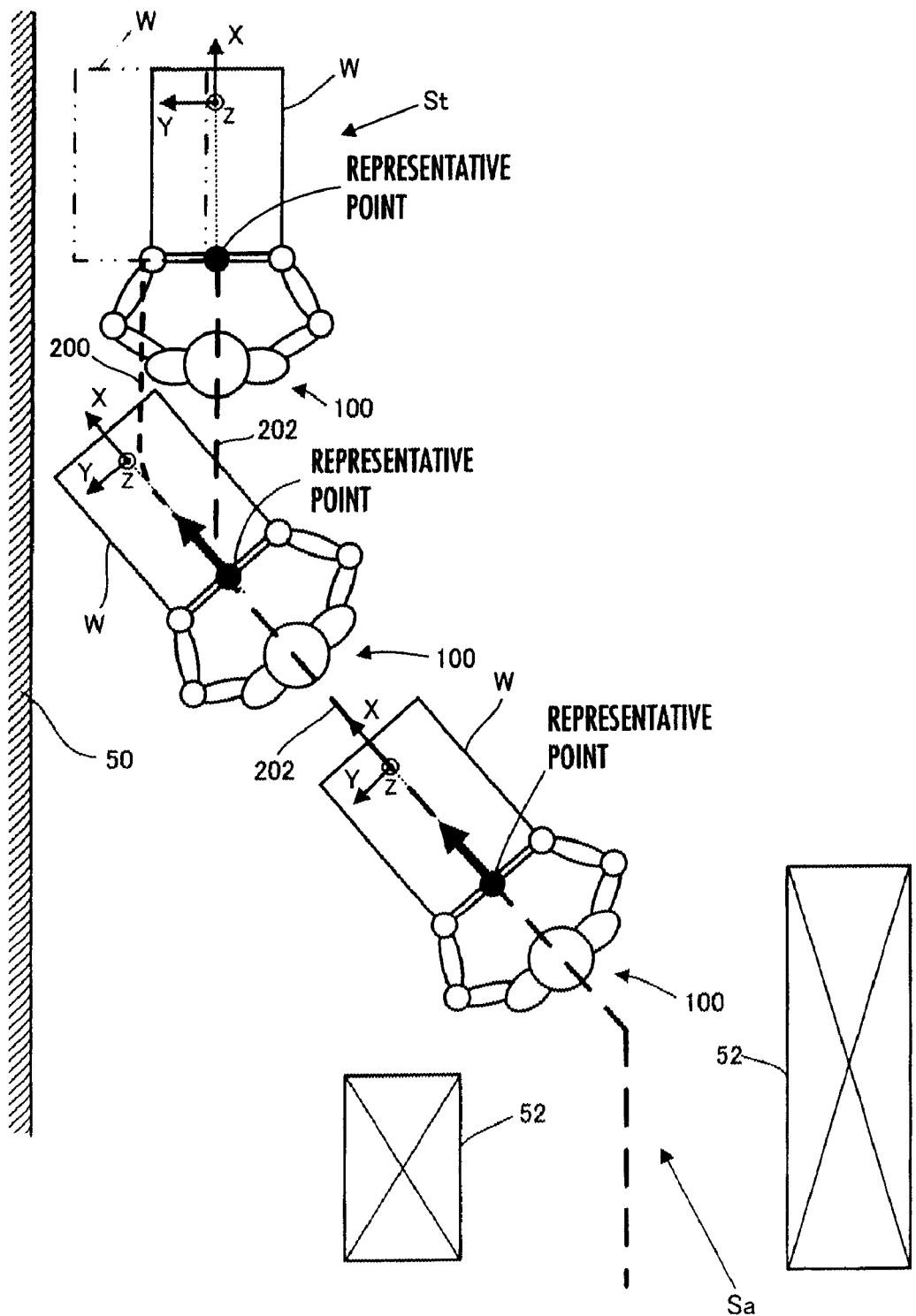
FIG. 7 is a diagram illustrating a problem with a prior art.

An embodiment of the present invention will be described with reference to FIG. 1 to FIG. 6. FIG. 1 is an external perspective view of a mobile robot according to the present embodiment and an object, FIG. 2 is a block diagram illustrating the system construction related to the motion control of the mobile robot in the present embodiment, FIG. 3 is a plan view of the mobile robot and the object moved by the mobile robot observed in the direction of a yaw axis, FIG. 4 and FIG. 5 are explanatory diagrams illustrating an example of the processing by a server provided in the system of the present embodiment, and FIG. 6 is a flowchart illustrating the processing by a controller provided in the mobile robot of the present embodiment.

Referring to FIG. 1, a mobile robot 1 according to the present embodiment is a bipedal mobile robot (humanoid robot). The bipedal mobile robot 1 has a body 3 serving as the basic body thereof, a pair of right and left legs 5, 5 extending from the bottom end of the body 3, a pair of right and left arms 7, 7 extending from both sides of the upper portion of the body 3, and a head 9 disposed on the upper end of the body 3.

Each of the legs 5 is constructed of a first leg link 11, a second leg link 13, and a foot 15, which are connected in this order from the body 3 side, the distal portion of the leg 5 being composed of the foot 15 serving as a ground-contacting portion. In this case, the first leg link 11 of the leg 5 is connected to the body 3 through the intermediary of a hip joint 17 having the freedom degree of rotation about three axes. The second leg link 13 is connected to the first leg link 11 through the intermediary of a knee joint 19 having the freedom degree of rotation about one axis. The foot 15 is connected to the second leg link 13 through the intermediary of an ankle joint 21 having the freedom degree of rotation about two axes. The legs 5 are capable of performing motions similar to those of human legs by means of the rotational motions of the joints 17, 19 and 21. In this case, for example, the mobile robot 1 is capable of traveling by alternately implementing, on the two legs 5 and 5, a motion in which one leg 5 which is the leg 5 serving as a free leg is lifted in the air and moved while the other leg 5 which is the leg 5 serving as the supporting leg is maintained in contact with a floor in the environment in which the mobile robot 1 is traveling, and then the free leg is landed.

Each of the arms 7 is constituted of a first arm link 23, a second arm link 25, and a hand 27, which are connected in this order from the body 3 side, the distal portion of each of the arms 7 being composed of the hand 27. In this case, the first arm link 23 of each of the arms 7 is connected to the body 3 through the intermediary of a shoulder joint 29 having the freedom degree of rotation about three axes. The second arm link 25 is connected to the first arm link 23 through the intermediary of an elbow joint 31 having the freedom degree of rotation about one axis. The hand 27 is connected to the second arm link 25 through the intermediary of a wrist joint 33 having the freedom degree of rotation about three axes. Further, each of the arms 7 is capable of performing motions similar to those of a human arm, such as bringing the hand 27 into contact with an object, by means of the rotational motions of the joints 29, 31 and 33. The hand 27 is equipped with a plurality of fingers, which enable the hand 27 to perform an operation, such as holding an object, by moving the joints of the fingers (e.g., by bending the fingers).

Although not shown in FIG. 1, the mobile robot 1 is provided with, as a part of the system for controlling the motions thereof, a plurality of joint actuators 35, 35 and so on of electric motors for driving the joints, including the finger joints of the hands 27, of the legs 3 and the arms 4, various sensors 37, 37 and so on for detecting the motional states of the mobile robot 1 and the environmental information on the surroundings thereof, a communication unit 39 for performing communication with outer sources, and a control unit 41, as illustrated in FIG. 2. Further, in the present embodiment, a server 45 for implementing the communication with the control unit 41 of the mobile robot 1 through the intermediary of a communication unit 43 is provided outside the mobile robot 1. In the present embodiment, the controller of the mobile robot in accordance with the present invention is constituted by the combination of the control unit 41 and the server 45.

The sensors 37 include, for example, the force sensors for detecting floor reaction forces acting on the feet 15 when the feet 15 of the legs 3 land on the ground, the force sensors for detecting reaction forces acting on the hands 27 when the hands 27 of the arms 4 are brought in contact with an object, an acceleration sensor for detecting the acceleration of the body 3, a rate sensor for detecting the angular velocity of the body 3, a tilt sensor for detecting the tilt angle of the body 3, joint displacement sensors for detecting the displacement amounts (rotational angles) of the joints, and an imaging camera for acquiring images of ambient environments, including an area ahead of the mobile robot 1.

The control unit 41 is an electronic circuit unit which includes a microcomputer, an interface circuit, and an actuator drive circuit. The control unit 41 uses the detection data of the sensors 37 and command data supplied from the server 45 through the intermediary of the communication unit 39 to carry out arithmetic processing specified by a preinstalled program or a program downloaded, as necessary, thereby sequentially determining the manipulated variables of the joint actuators 35 (e.g., command currents of the electric motors). Then, the control unit 41 controls the joint actuators 35 on the basis of the manipulated variables so as to control the motions of the mobile robot 1. The control unit 41 includes the processing function of an object representative point setting means in the present invention.

The server 45 is constructed of a computer. The server 45 retains map data on the environment in which the mobile robot 1 travels. The map data includes the information on the layout of obstacles, such as a wall and an installed object, in the traveling environment of the mobile robot 1. If, for example, a request for moving an object, such as a cart, by the mobile robot 1 is generated, then the server 45 prepares a movement scheme for the object, as will be discussed later. Then, the server 45 outputs the prepared movement scheme to the mobile robot 1 through the intermediary of the communication unit 43. Incidentally, the server 45 includes the processing function of a desired angular difference value setting means in the present invention.

The operation whereby an object is moved by the mobile robot 1 described above will now be described. For this purpose, the case where, for instance, a cart W shown in FIG. 1 as the object is moved will be taken as the example. The object (cart) W illustrated in FIG. 1 is equipped with a plurality of wheels WR which come in contact with a floor surface of an environment in which the object W is moved and the mobile robot 1 travels. The rotation of the wheels WR allows the object W to move on the floor surface. Each of the wheels WR of the object W can be rotated about a vertical axis, thus enabling the direction of the object W to be changed.

When a request for moving the object (cart) W is issued, first, the server 45 prepares a movement scheme for the object W. At this time, the server 45 creates the movement scheme for the object W on the basis of the required conditions of the movement mode of the object W by referring to map data. The movement scheme may be created before the request for moving the object W is issued.

Here, the required conditions of the movement mode of the object W include, for example, the destination of the movement of the object W, the required posture of the object W at the destination, via points, the required postures of the object W at the via points, the arrival time of the object W at the destination or the via points, the movement start time of the object W, and the permissible lower limit value of the interval between a wall or an obstacle, which is present between the movement start point of the object W and the destination, and the object W and the mobile robot 1 (the permissible lower limit value of the interval for obviating the collision between the wall or the obstacle and the object W or the mobile robot 1). These required conditions are input to the server 45 before starting the movement of the object W or read from a storage unit by the server 45 at a predetermined timing. The posture of the object W means the spatial orientation of the object W.

Then, the server 45 prepares the movement scheme of the object W while referring to the map data such that the above required conditions are met. The movement scheme provides a guideline indicating how the object W should be moved at proper timings. In other words, the movement scheme provides the guideline for a desired position trajectory as the time series of a desired position of the representative point which represents the spatial position of the object W and a desired posture trajectory as the time series of a desired posture of the object W.

In this case, the movement scheme created by the server 45 is composed of, for example, the desired route of the object W from a movement start point to a destination (the desired spatial route of the representative point of the object W), the desired posture of the object W on the desired route, the movement start time of the object W, and the desired moving velocity of the object W on the desired route. The movement scheme may be any scheme as long as it allows the desired position trajectory and the desired posture trajectory to be determined on the basis thereof, and the movement scheme may be the desired position trajectory and the desired posture trajectory themselves.

Here, the desired posture of the object W will be supplementally described with reference to FIG. 3, which schematically illustrates the mobile robot 1 and the cart W.

In the present embodiment, the desired posture of the object W in the movement scheme prepared by the server 45 includes the desired value of the angular difference about the yaw axis (hereinafter referred to as "the desired yaw angle posture value") between the reference direction of the object W preset for the object W and the direction of the moving velocity vector of the representative point of the object W on the desired route (the change vector per unit time of the position of the representative point). The yaw axis means an axis in the direction perpendicular to a floor surface in an environment in which the mobile robot 1 and the object W move or an axis in the vertical direction.

For example, as illustrated in FIG. 3, a case is assumed where a three-axis orthogonal coordinate system having the direction of the yaw axis thereof defined as the z-axis direction (the direction perpendicular to the paper surface of FIG. 3), the lengthwise direction (longitudinal direction) of the object W defined as the x-axis direction, and the width direction of the object W defined as the y-axis direction has been set for the object W as the object coordinate system. In this case, if the x-axis direction (the longitudinal direction of the object W) is defined as the reference direction of the object W, then a desired value $\theta$ of the angular difference about the yaw axis (about the z axis) between the x-axis direction and the direction of a moving velocity vector V of the representative point of the object W on the desired route (the tangential direction of the desired route) is the aforesaid desired yaw angle posture value. The desired yaw angle posture value $\theta$ defines the desired posture of the object W about the yaw axis in relation to the desired route. The reference direction of the object W may be set to any direction among the directions orthogonal to the yaw axis; however, for the sake of convenience in the description of the present embodiment, the longitudinal direction of the object W (the x-axis direction of the object coordinate system) is defined as the reference direction of the object W. In the present embodiment, the position of the representative point of the object W in the object coordinate system is variably set on the basis of the desired yaw angle posture value $\theta$, which will be described hereinafter.

Supplementally, for the sake of convenience, the value of the desired yaw angle posture value $\theta$ in the description of the present embodiment below is defined as follows. The desired yaw angle posture value $\theta$ in the state wherein the direction of the moving velocity vector V of the representative point of the object W and the positive direction of the x axis of the object coordinate system (the direction from the rear end toward the front end of the object W) agree with each other when observed in the yaw-axis direction is defined as zero degrees. Then, the desired yaw angle posture value θ in the state wherein the object W has rotated clockwise for a rotational angle of 180 degrees or less from the aforesaid state is defined as a positive value having the same magnitude as that of the rotational angle. Further, the desired yaw angle posture value θ in the state wherein the object W has rotated counterclockwise for a rotational angle of 180 degrees or less from the state wherein θ is zero is defined as a negative value having the same magnitude as that of the rotational angle. In this case, the desired yaw angle posture value θ may be set in the range of −180 degrees to 180 degrees.

The server 45 variably sets the desired yaw angle posture value θ according to the aforesaid required conditions of the movement mode of the object W. A setting example will be described with reference to FIG. 4 and FIG. 5.

FIG. 4 schematically illustrates a desired route of the object W observed in the yaw-axis direction and the states of the instantaneous motions of the object W and the mobile robot 1 at a plurality of points S1 to S4 included in the desired route. In this example, a point S4 is the destination of the object W and the point S4 is close to a wall 50. Further, in this example, of the aforesaid required conditions, the condition related to the position and posture of the object W at the destination S4 requires that the object W be moved close to the wall 50 while setting the longitudinal direction of the object W (the x-axis direction of the object coordinate system) in parallel to the surface of the wall 50. Here, "moving the object W close to the wall 50" means to bring the interval between the object W and the surface of the wall 50 to a predetermined value or less.

In this case, the desired route of the object W is prepared such that, for example, the object W is moved close to the wall 50 from a movement start point (not shown) of the object W to the destination S4 while dodging an obstacle 52, as indicated by the dashed line in FIG. 4. In this case, the desired yaw angle posture value θ at the desired posture of the object W is set to zero degrees at the points in a section D1 (e.g., points S1 and S2) of the desired route at which the distance from the wall 50 (the distance in the direction perpendicular to the surface of the wall 50) is larger than a predetermined distance da. In other words, at a point in the section D1, the desired yaw angle posture value θ is set such that the longitudinal direction (the x-axis direction) of the object W is the same as the direction of the moving velocity vector V (the tangential direction of the desired route) of the representative point of the object W at the point. In this example, it is assumed that the object W or the mobile robot 1 will not come in contact with other obstacles in the section D1 even if the desired yaw angle posture value θ is set to zero degrees.

At a point in a section D2 (e.g., a point S3) at which the distance from the wall 50 becomes the predetermined distance da or less, the desired yaw angle posture value θ is set such that the longitudinal direction (the x-axis direction) of the object W is the same as the longitudinal direction of the object W (the direction parallel to the surface of the wall 50) at the destination S4. Therefore, at a point in the section D2, the desired yaw angle posture value θ is set such that the longitudinal direction (the x-axis direction) of the object W is aslant with respect to the direction of the moving velocity vector V (the tangential direction of the desired route) of the representative point of the object W at that point.

The desired yaw angle posture value θ in the section D2 takes a constant value if the desired route in the section D2 is linear. If the desired route in the section D2 is curved, then the desired yaw angle posture value θ changes as the tangential direction of the desired route changes.

Supplementally, the example in FIG. 4 illustrates a case wherein the object W is brought close to the wall 50 at the destination S4. A movement scheme is prepared in the same manner as that of the example given in FIG. 4 when moving the object W close to an installed object, such as a desk, and bringing the object W close to the installed object with the longitudinal direction of the object W set in the direction parallel to the side surface of the installed object.

FIG. 5 schematically illustrates the desired route of the object W as observed in the yaw-axis direction and the instantaneous motion states of the object W and the mobile robot 1 at a plurality of points S5 to S8 included in the desired route, as with FIG. 4. In this example, a plurality of obstacles 52 exists around the point S6 as one of the points which the object W passes, and the pathway width near the point S6 is relatively small. In this case, the desired route of the object W is set, for example, as indicated by the dashed line in FIG. 5. In this example, the desired route is set such that the object W moves linearly toward the point S6 in a section D3 preceding the point S6. Further, the desired route is set such that the object W is moved sideways (in the direction orthogonal to the direction in which the object W moves in the section D3) so as to obviate the collision between the object W and the obstacle 52 in a section D4 following the section D3. Further, the desired route is set such that, in a section D5 following the section D4, the object W is moved in the same direction in which the object W is moved in the section D3.

Regarding the desired posture of the object W, the desired yaw angle posture value θ is set as described below in order to satisfy the condition related to the interval between the object W and the mobile robot 1 and the obstacles 52 (the condition that the interval is maintained at a predetermined permissible lower limit value or more so as to obviate the collision between the object W or the mobile robot 1 and the obstacles 52) among the required conditions.

At a point within the section D3 (e.g., the point S5), the desired yaw angle posture value θ is set to zero degrees. In other words, at a point within the section D3, the desired yaw angle posture value θ is set such that the longitudinal direction (the x-axis direction) of the object W is the same as the direction of the moving velocity vector V of the representative point of the object W (the tangential direction of the desired route) at that particular point.

Meanwhile, in the section D4, setting the longitudinal direction (the x-axis direction) of the object W in the tangential direction of the desired route in the section D4 requires the object W to be rotated about the yaw axis at the point S6. In this case, since the pathway width at the point S6 is small, the object W or the mobile robot 1 would collide with the obstacle 52, so that the aforesaid required condition related to the interval between the object W and the mobile robot 1 and the obstacle 52 cannot be satisfied. In the present example, therefore, the desired yaw angle posture value θ at points in the section D4 (e.g., the points S6 and S7) is set at, for example, 90 degrees. In other words, the desired yaw angle posture value θ is set such that the longitudinal direction (the x-axis direction) of the object W is orthogonal with respect to the direction of the moving velocity vector V of the representative point of the object W (the tangential direction of the desired route) at the points in the section D4, including the point S6. This means that the desired yaw angle posture value θ in the section D4 is set such that the desired posture (the desired posture observed in a coordinate system fixed to a floor) of the object W in the section D4 is maintained at the same posture as the desired posture of the object W in the section D3.

At a point in the section D5 (e.g., the point S8), the desired yaw angle posture value θ is set to zero degrees. This means that the desired yaw angle posture value θ is set such that the longitudinal direction (the x-axis direction) of the object W is the same as the direction of the moving velocity vector V of the representative point of the object W (the tangential direction of the desired route) at that particular point.

Thus, in the example given in FIG. 5, the desired yaw angle posture value θ is set variably for each of the sections D3 to D5, thereby creating a movement scheme that satisfies the required condition related to the interval between the object W and the mobile robot 1 and the obstacles 52.

Supplementally, according to the present embodiment, the position on the object coordinate system of the representative point of the object W to be positioned on a desired route is variably set on the basis of the desired yaw angle posture value θ, as will be discussed later. For this reason, when variably setting the desired yaw angle posture value θ such that the required condition related to the interval between the object W and the mobile robot 1 and the obstacles 52 at the point S6 or the like, changes in the position of the representative point of the object W (with a resultant dislocation of the object in relation to a desired route) caused by changes of the desired yaw angle posture value θ are taken into account in setting the desired yaw angle posture value θ.

By the processing carried out by the server 45 described above, the movement scheme of the object W, including the desired yaw angle posture value θ, is prepared such that the required conditions related to the movement mode of the object W are satisfied. After preparing the movement scheme as described above, the server 45 outputs command data indicating that the movement of the object W should be started to the mobile robot 1 through the intermediary of the communication unit 43. Further, the movement scheme of the object W is output to the mobile robot 1 in response to a request from the mobile robot 1.

Meanwhile, upon receipt of the command data indicating that the movement of the object (cart) W should be started through the intermediary of the communication unit 39, the control unit 41 of the mobile robot 1 controls the joint actuators 35 of the arms 7 and the like of the mobile robot 1 so as to bring the hands 27, 27 of the two arms 7, 7 of the mobile robot 1 into contact with a predetermined portion adjacent to a lengthwise end of the object W.

For example, as illustrated in FIG. 1, with the mobile robot 1 standing opposing one end, namely, the rear end, in the lengthwise direction (longitudinal direction) of the object W, the portions at both ends of a bar Wb provided above the rear edge of the object W are held by the right and left hands 27, 27. In this case, the mobile robot 1 stands opposing the object W in a position and a posture which do not cause the arms 7, 7 to fully stretch and the body 3 or the like to interfere with the object W.

Supplementally, the portions to be held by the hands 27, 27 of the mobile robot 1 do not have to be the bar Wb. For example, the portions at both ends adjacent to the rear edge of a rack plate at the top of the cart W illustrated in FIG. 1 may be grasped by the hands 27, 27. In the present embodiment, as described above, the portions adjacent to the rear edge of the object W are grasped by the hands 27, 27 of the mobile robot 1, so that the longitudinal direction of the object W is, in other words, the direction of the interval between one end (the rear end) and the other end (the front end) of the object W.

Subsequently, the control unit 41 sequentially carries out the processing illustrated by the flowchart in FIG. 6 at a predetermined arithmetic processing cycle to cause the mobile robot 1 to perform the operation of moving the object W.

In this processing, the control unit 41 acquires the movement scheme of the object W from the server 45 through the intermediary of the communication unit 39 (STEP1). The movement scheme acquired here includes at least the movement scheme of the object W in a future predetermined period of time from the current time. The predetermined period of time is, for example, a period of time for a predetermined plurality of steps (e.g., a period of time for three steps) of the mobile robot 1. The predetermined period of time may be, for example, the period of time until, for example, predetermined time elapses from the current time or the period of time until the distance of the object W reaches a predetermined distance when the object W is moved from the current position thereof according to the movement scheme.

The processing in STEP1 does not have to be carried out at each arithmetic processing cycle of the control unit 41; instead, it may be carried out each time the aforesaid predetermined period of time elapses. The movement scheme of the object W over the whole process from the start point to the arrival point of the movement of the object W may be acquired at the start of the movement of the object W or immediately before the start. Further alternatively, if the movement scheme has been prepared by the server 45 before starting the movement of the object W, then the movement scheme of the whole process of the object W may be acquired beforehand from the server 45 and retained in a storage device of the control unit 41.

Subsequently, the control unit 41 generates a desired position trajectory and a desired posture trajectory of the object W from the current time to the future on the basis of the movement scheme acquired in STEP1 (STEP2).

The desired position trajectory and the desired posture trajectory are basically generated to follow the movement scheme of the object W. However, the mobile robot 1 according to the present embodiment is a bipedal mobile robot, so that an attempt to move the object W exactly according to the movement scheme may impair the stability of the posture of the mobile robot 1.

Hence, according to the present embodiment, in the processing in STEP2, the control unit 41 generates a provisional desired position trajectory and a provisional desired posture trajectory of the object W exactly in accordance with the movement scheme, and then performs the calculation to predict the future motions of the mobile robot 1 on the assumption that the object W is moved according to the provisional desired position trajectory and the provisional desired posture trajectory. Then, the control unit 41 determines whether the future motions of the mobile robot 1 predicted by calculation will allow the stability of the posture of the mobile robot 1 to be properly maintained. If the determination result is affirmative, then the control unit 41 determines the provisional desired position trajectory and the provisional desired posture trajectory of the object W directly as the actual desired position trajectory and the actual desired posture trajectory, respectively, of the object W.

If the determination result is negative, then the control unit 41 corrects the provisional desired position trajectory out of the provisional desired position trajectory and the provisional desired posture trajectory, and then determines the corrected desired position trajectory and the provisional desired posture trajectory (the desired posture trajectory based on the movement scheme) as the actual desired position trajectory and the actual desired posture trajectory, respectively, of the object W. In this case, the desired position trajectory is corrected such that the corrected desired position trajectory of the object W follows the movement scheme of the object W as closely as possible and the future motions of the mobile robot 1 predicted on the basis of the corrected desired position trajectory and the desired posture trajectory based on the movement scheme allow the stability of the posture of the mobile robot 1 to be properly secured.

It is assumed that, for instance, the movement scheme of the object W is designed to move the object W at a maximum traveling speed or a traveling speed close thereto for the mobile robot 1 to travel straight, and the desired route of the object W defined by the desired position trajectory based on the movement scheme of the object W has a section with a relatively acute curve in the middle thereof. In this case, in the section with the relatively acute curve, it is frequently difficult to secure the stability of the posture of the mobile robot 1 while moving the object W and the mobile robot 1 at the maximum traveling speed or the speed close thereto. In such a case, the desired position trajectory of the object W is corrected such that the moving speed of the object W is lower than the moving speed based on the movement scheme in the particular section and the sections immediately preceding and following the particular section.

The desired position trajectory and the desired posture trajectory of the object W described above may be generated using the same technique as the technique proposed in, for example, the aforesaid patent document 1. In the present embodiment, however, the desired posture of the object W follows the movement scheme, so that the longitudinal direction (the reference direction) of the object W and the direction of the moving velocity vector (the tangential direction of the desired route) of the representative point of the object W are not necessarily the same, which differs from the technique disclosed in patent document 1. In this case, the desired position trajectory and the desired posture trajectory of the object W are described by means of a supporting leg coordinate system which is set using, as the origin, the point on the ground contact surface of the foot 15 of the supporting leg of the two legs 5, 5 of the mobile robot 1. However, the coordinate system for describing the desired position trajectory and the desired posture trajectory of the object W is not limited to the aforesaid supporting leg coordinate system; it may be, for example, a coordinate system fixedly set on the floor on which the object W is moved and the mobile robot 1 travels (an absolute coordinate system).

After generating the desired position trajectory of the representative point of the object W and the desired posture trajectory of the object W as described above, the control unit 41 then variably sets the position of the representative point of the object W on the basis of the desired yaw angle posture value θ in the desired posture trajectory (STEP3). In this case, the position of the representative point variably set is the position of the representative point of the object W in the object coordinate system as observed in the yaw-axis direction.

The processing in this STEP3 will be specifically explained with reference to FIG. 3. In the processing in STEP3, the control unit 41 variably sets the position of the representative point on the XY plane of the object coordinate system on the basis of the desired yaw angle posture value θ on a line segment connecting preset points P1 and P2, as illustrated in FIG. 3. The point P1 is a point adjacent to the rear end of the object W (adjacent to one end of the object W on the mobile robot 1 side). In the illustrated example, the point P1 is the central point between the portions on both ends of the bar Wb of the object W (the portions grasped by the hands 27, 27 of the mobile robot 1), i.e., the central point of the rear end portion in the width direction of the object W.

The point P2 is a point between the point P1 and the front end (the other end) of the object W and the point is farther toward the front end of the object W than the point P1 from the mobile robot 1. In the illustrated example, the point P2 is the point which has been moved from the point P1 by a predetermined distance toward the front end of the object W in the x-axis direction of the object coordinate system (in the direction away from the mobile robot 1). In this case, the inertial moment of the object W about the yaw axis passing an arbitrary point on the line segment connecting the points P1 and P2 reduces as the arbitrary point moves closer to the point P2. Here, it is assumed that the position of the center of gravity of the object W as observed in the yaw-axis direction is the same position as that of the point P2 or a position farther away from the mobile robot 1 than the point P2.

Further, in the processing in STEP3, the control unit 41 sets the position of the representative point (the position in the object coordinate system) at each time on the desired posture trajectory and the desired position trajectory on the basis of the desired yaw angle posture value θ of the desired posture at each time. In this case, according to the present embodiment, if the desired yaw angle posture value θ at certain time takes the value at which the longitudinal direction (the x-axis direction of the object coordinate system) of the object W and the direction of the moving velocity vector V of the representative point at the certain time become the same direction in a plan view as observed in the yaw-axis direction (0° or 180° or −180° in the present embodiment; each of these values will be hereinafter referred to generically as "the first angular difference"), then the position of the representative point of the object W at the certain time is set to the position of the aforesaid point P1. If the desired yaw angle posture value θ at certain time is the value at which the longitudinal direction of the object W (the x-axis direction of the object coordinate system) and the direction of the moving velocity vector V of the representative point at the certain time are orthogonal with respect to each other in the plan view as observed in the yaw-axis direction (90° or −90° in the present embodiment; each of these values will be hereinafter referred to generically as "the second angular difference"), then the position of the representative point of the object W at the certain time is set to the position of the aforesaid point P2. Further, the position of the representative point is set such that, as the desired yaw angle posture value θ at certain time changes toward the second angular difference from the first angular difference, the position of the representative point of the object W at the certain time shifts toward the point P2 from the point P1. Therefore, the position of the representative point of the object W is set such that the inertial moment of the object W about the yaw axis passing the representative point reduces as the desired yaw angle posture value θ is closer to the second angular difference than the first angular difference.

By variably setting the position of the representative point of the object W, the position of the representative point of the object W in the section D1 is set to the position of the point P1 in the movement mode of the object W illustrated in FIG. 4. The position of the representative point of the object W in the section D2 is set at a position away from the mobile robot 1 toward the front end side of the object W between the point P1 and the point P2.

In the movement mode of the object W illustrated in FIG. 5, the position of the representative point of the object W in the sections D3 and D5 is set to the position of the point P1. The position of the representative point of the object W in the section D4 is set to the point P2.

The position of the representative point of the object W does not necessarily have to be continuously changed on the basis of the desired yaw angle posture value θ. For example, if the desired yaw angle posture value θ falls within a predetermined range close to the first angular difference, then the position of the representative point of the object W may be set to the position of the point P1, or the position of the representative point of the object W may be set to the position of the point P2 if the desired yaw angle posture value θ deviates from the predetermined range (if the θ is close to the second angular difference).

Further alternatively, when the desired yaw angle posture value θ has changed, the position of the representative point of the object W may be gradually changed from the position before the desired yaw angle posture value θ was changed to the position based on the updated value of the desired yaw angle posture value θ.

Supplementally, the processing in STEP3 described above constitutes the object representative point setting means in the present invention.

After setting the position of the representative point of the object W as described above, the control unit 41 generates a desired gait of the mobile robot 1 (STEP4). In this case, the position of the representative point of the object W set in STEP3 and the posture of the object W are made to follow the desired position trajectory and the desired posture trajectory respectively generated in STEP2, and the desired gait of the mobile robot 1 is generated such that the stability of the posture of the mobile robot 1 is maintained. The desired gait can be generated by the same technique as that proposed in the aforesaid patent document 1. The desired gait in this case is composed primarily of the desired position/posture trajectory of the foot 15 of each leg 5 (the time series of the desired position and the desired posture of the foot 15), the desired position/posture trajectory of the body 3 (the time series of the desired position and the desired posture of the body 3), the desired ZMP trajectory (the time series of the desired position of the so-called ZMP), the desired total floor reaction force trajectory (the time series of the desired value of the total floor reaction force acting on the mobile robot 1), and the desired position/posture trajectory of the hand 27 of each arm 7 (the time series of the desired position and the desired posture of the hand 27). The ZMP here means the point on a floor surface at which the moment of the resultant force of the gravitational force acting on the mobile robot 1, the inertial force generated by a motion of the mobile robot 1, and the reaction force acting on the mobile robot 1 from the object W becomes zero, excluding the component about the vertical axis thereof.

Subsequently, the control unit 41 controls the joint actuators 35 of the legs 5, 5 and the arms 7, 7 of the mobile robot 1 on the basis of the desired gait of the mobile robot 1 created as described above (STEP5). More specifically, the control unit 41 determines the desired displacement amounts of the joints of the legs 5, 5 and the arms 7, 7 on the basis of the desired gait, and determines the manipulated variables of the joint actuators 35 on the basis of the desired displacement amounts. Then, the joint actuators 35 are controlled on the basis of the manipulated variables.

The processing in STEP1 to STEP5 described above is sequentially carried out at a predetermined arithmetic processing cycle. Thus, the motions of the mobile robot 1 are controlled such that the position of the representative point of the object W and the posture of the object W follow the desired position trajectory and the desired posture trajectory, respectively, thereby moving the object W by the mobile robot 1.

In this case, when moving the object W, as illustrated in FIG. 4, the mobile robot 1 moves the object W along the desired route while traveling forward, following the object W from behind the object W, in the section D1. In the section D2, the mobile robot 1 moves the object W along the desired route while traveling forward aslant. At this time, in the section D2, the posture of the object W is maintained such that the longitudinal direction of the object W is substantially parallel to the surface of the wall 50 to which the object W is to be brought close, i.e., the desired posture of the object W at the destination S4. Hence, the object W can be brought close to the wall 50 in a monotonous movement mode without the need for changing the posture of the object W in the vicinity of the destination S4. This means that the object W can be brought close to the wall 50 in a posture such that the longitudinal direction of the object W is set in parallel to the surface of the wall 50 without the need for a complicated desired route, such as one in which the object W is moved back and forth in the vicinity of the destination S4. This applies also to a case where the object W is disposed near an installed object at a destination.

Further, in the section D2, the object W is moved in a direction aslant with respect to the longitudinal direction of the object W while applying a force from the mobile robot 1 to the rear end of the object W. This frequently causes the posture of the object W about the yaw axis to deviate from a desired posture. Nevertheless, the position of the representative point of the object W is set to a position closer to the point P2 from the point P1, leading to a relatively small inertial moment of the object W about the yaw axis which passes the representative point. This enables the mobile robot 1 to promptly control the posture of the object W to a desired posture with a relatively small force. In the section D1, the representative point of the object W is set to the position of the point P1, so that the inertial moment of the object W about the yaw axis which passes the representative point becomes relatively large. Further, in this case, the direction of the moving velocity vector of the representative point agrees with the longitudinal direction of the object W, resulting in enhanced stability of the posture of the object W.

When moving the object W, as illustrated in FIG. 5, the mobile robot 1 moves the object W along the desired route while traveling forward, following the object W from behind the object W, in the sections D3 and D5. Further, in the section D4, the mobile robot 1 moves the object W along the desired route while traveling sideways. At this time, in the section D4, the existence of the obstacle 52 beside the desired route causes the passable pathway width for the object W and the mobile robot 1 to be relatively small. Nevertheless, the object W can be moved through the narrow pathway without changing the posture of the object W at points in the section D4 by moving the object W and the mobile robot 1 sideways.

In the section D4, as with the section D2 in FIG. 4, the posture of the object W about the yaw axis tends to deviate from the desired posture; however, the position of the representative point of the object W is set to the position of the point P2, leading to a relatively small inertial moment of the object W about the yaw axis which passes the representative point. This enables the mobile robot 1 to promptly control the posture of the object W to the desired posture with a relatively small force, as with the section D1 in FIG. 4. In the sections D3 and D5 wherein the longitudinal direction of the object W and the direction of the moving velocity vector of the representative point are set to the same direction, the representative point of the object W is set to the position of the point P1, thus enhancing the stability of the posture of the object W, as with the section D1 in FIG. 4.

The embodiments of the present invention are not limited to the one described above, but can be implemented in various modifications. The following will describe some examples of the modifications.

The mobile robot may be a mobile robot of a type other than a bipedal mobile robot. The present invention may be applied to, for example, a legged mobile robot having three or more legs or a mobile robot which has a plurality of rotatable spherical components in contact with a floor and which moves by rotating the spherical components. The present invention applies to any mobile robot as long as the advancing direction thereof can be changed about the yaw axis.

Further, the mobile robot may be a mobile robot having three or more arms or a mobile robot having only one arm. The arm may be designed such that only the distal portion thereof can be moved with respect to the body of the mobile robot.

The distal portion of the arm of the mobile robot which comes in contact with a portion adjacent to one end of an object does not necessarily have to be constructed to grasp the portion. The distal portion of the arm may be constructed to, for example, simply touch the surface portion adjacent to one end of the object or constructed to be fitted to the portion adjacent to one end of the object.

The object to be moved by the mobile robot may not be equipped with wheels. The object may be, for example, a substance having the flat portion of the bottom surface thereof directly in contact with a floor surface (e.g., a simply box-like substance). Further, an object may be moved without letting the object come in contact with a floor surface. The present invention may be applied also to a case where a portion of a substance, such as a lengthy plate, adjacent to one end thereof is held by an arm of a mobile robot and the substance is moved by lifting the whole substance off a floor. The present invention is especially suited for moving a substance having a relatively large distance between a portion adjacent to one end and a portion adjacent to the other end, which portions are to be in contact with the distal portions of arms of a mobile robot.

If an object is moved by a mobile robot having high stability, such as a mobile robot with three legs or more or a mobile robot which moves with a plurality of rotatable spherical components which come in contact with a floor, then the desired position trajectory and the desired posture trajectory of the object for the whole movement process may be prepared in exact accordance with the movement scheme prepared by the server 45. The preparation does not have to be accomplished by a controller installed in a mobile robot; instead, the preparation may be accomplished by the server 45.

The movement scheme of an object may be created by the control unit 41 of the mobile robot 1. In this case, map data may be retained in the control unit 41 or the map data alone may be acquired from an external server to create the movement scheme for the object by the control unit 41.

When preparing a movement scheme by the server 45, the position of the representative point of an object may be set by the server 45 and may be output to the control unit 41 of the mobile robot 1 from the server 45.

What is claimed is:

1. A controller of a mobile robot configured to control the mobile robot to perform an operation of moving an object such that a position of a representative point of the object and a posture of the object follow a desired position trajectory and a desired posture trajectory while maintaining a distal portion of an arm of the mobile robot in contact with a predetermined portion of the object, the controller comprising: a processor;

a desired angular difference value setting means which variably sets a desired value of an angular difference about a yaw axis between a reference direction preset for the object which is a direction orthogonal to the yaw axis of the object and a direction of a moving velocity vector of the representative point of the object defined by the desired position trajectory, wherein the desired angular difference value setting means sets the desired value of the angular difference based on at least a required condition related to a movement mode of the object; and an object representative point setting means which variably sets the position of the representative point of the object in an object coordinate system fixed to the object based on the desired value of the angular difference such that an inertial moment of the object about the yaw axis passing the representative point changes based on the desired value of the angular difference, wherein a desired posture in the desired posture trajectory includes the desired value of the angular difference.

2. The controller of a mobile robot according to claim 1, wherein the predetermined portion of the object in contact with the distal portion of the arm of the mobile robot is a portion adjacent to one end of the object, the angular difference includes at least a first angular state and a second angular state, wherein a first angular difference is defined as the angular difference in the first angular state wherein a direction of an interval between one end and another end of the object agrees with the direction of the moving velocity vector in a plan view observed in the direction of the yaw axis, and a second angular difference is defined as the angular difference in the second angular state wherein the direction of the interval and the direction of the moving velocity vector are orthogonal to each other, and wherein the object representative point setting means sets the position of the representative point such that the inertial moment of the object decreases as the desired value of the angular difference gets closer to the second angular difference and gets further from the first angular difference.

3. The controller of a mobile robot according to claim 1, wherein the required condition includes a condition that the object is brought close to one of a wall and an installed object with a lengthwise direction of the object set in parallel to one of a surface of the wall and a side surface of the installed object at a destination of the movement of the object, and the desired angular difference value setting means sets the desired value of the angular difference such that the lengthwise direction of the object is set in parallel to the one of the surface of the wall and the side surface of the installed object at least from a point at which a distance from the one of the surface of the wall and the side surface of the installed object to the object reaches a predetermined distance or less to the destination in a desired spatial route of the representative point of the object defined by the desired position trajectory and the desired posture trajectory.

4. The controller of a mobile robot according to claim 1, wherein the required condition includes a condition that, in a case where the object and the mobile robot are moved in an area wherein an obstacle exists beside a desired spatial route of the representative point of the object defined by the desired position trajectory and the desired posture trajectory, an interval between the object and the mobile robot is maintained at a predetermined value or more, and the desired angular difference value setting means sets the desired value of the angular difference such that the required condition is satisfied.

\* \* \* \* \*